United States Patent [19]
Clark

[11] 3,874,410
[45] Apr. 1, 1975

[54] COUPLER VALVE ASSEMBLY

[75] Inventor: Charles R. Clark, Mission, Calif.

[73] Assignee: Parker-Hannifin Corporation, Cleveland, Ohio

[22] Filed: Aug. 11, 1972

[21] Appl. No.: 279,751

[52] U.S. Cl............. 137/614, 137/220, 137/614.18
[51] Int. Cl.............................................. G05d 16/10
[58] Field of Search.......... 137/614, 614.01, 614.02, 137/614.03, 614.04, 614.05, 614.06, 220, 505.26, 514.7, 614.18, 219; 244/135 R, 135 A, 135 C

[56] References Cited
UNITED STATES PATENTS

| | | | |
|---|---|---|---|
| 208,986 | 10/1878 | Patterson................... | 137/614.18 X |
| 3,025,881 | 3/1962 | Freeman.......................... | 137/627.5 |
| 3,092,153 | 6/1963 | Stoyke............................ | 137/614 X |
| 3,119,405 | 1/1964 | Guy................... | 137/220 X |
| 3,338,259 | 8/1967 | Tribe..................... | 137/220 |
| 3,521,661 | 7/1970 | Hollcroft et al. ................... | 137/220 |
| 3,586,033 | 6/1971 | Hieber................................ | 137/220 |
| 3,605,788 | 9/1971 | Brown............................... | 137/220 |

*Primary Examiner*—Charles J. Myhre
*Assistant Examiner*—Ira S. Lazarus
*Attorney, Agent, or Firm*—Diller, Brown, Ramik & Wight

[57] ABSTRACT

A valve assembly of a coupler which includes a first valve member normally sealing the coupler unless engaged by a cooperating coupling element, and a second valve member responsive to variations in pressure above a predetermined value to restrict flow into the coupler when the first valve member is opened.

12 Claims, 4 Drawing Figures

PATENTED APR 1 1975　　3,874,410

COUPLER VALVE ASSEMBLY

This invention relates in general to new and useful improvement in fluid line couplers, and more particularly to a drogue of a probe and drogue type coupler for in-flight re-fueling.

BACKGROUND OF THE INVENTION

It is well known to provide a cooperating probe and drogue which will automatically couple to one another and wherein once the coupling has been accomplished, a head on the probe will project to open the probe for receiving fuel from the drogue and the head of the probe will, in turn, open a normally closed valve at the inlet of the drogue. Such probe and drogue coupling assemblies have generally performed satisfactorily. However, it has been found that undesirable pressure variations may exist during a re-fueling operation, which pressure variation is highly detrimental. Accordingly, more recently the drogue has been provided upstream of the outlet valve assembly with a pressure responsive valve. Such a drogue is disclosed in U.S. Pat. No. 3,586,033 granted to Ellsworth E. Hieber on June 22, 1971.

The incorporation of the pressure responsive valve upstream of the outlet valve assembly has required a material change in the drogue construction and has necessitated an undesirable elongation thereof.

SUMMARY OF THE INVENTION

In accordance with this invention, it is proposed to provide a drogue with a pressure responsive valve member in addition to the outlet valve member. However, it has been found that the over-all configuration of the drogue utilized in the past may be maintained by merely modifying the outlet valve assembly so as to incorporate directly therein the pressure responsive valve member.

In accordance with this invention, there is mounted within the valve housing of the outlet valve assembly between the outlet valve member and the valve housing the pressure responsive valve member. The pressure responsive valve member operates solely independently of the outlet valve member and the position and mounting thereof is one which in no way interferes with the operation of the outlet valve member.

Further, the pressure responsive valve member is urged to a normally retracted position within the valve body by a resilient member in the normal manner and is provided with a piston which cooperates with a sleeve portion of the valve body as a piston and cylinder arrangement so as to be pressure responsive.

The valve assembly in accordance with this invention occupies the same space as previously occupied by the outlet valve assembly and requires only a modification of the valve assembly. Other components of existing drouges remain unchanged.

With the above and other objects in view that will hereinafter appear, the nature of the invention will be more clearly understood by reference to the following detailed description, the appended claims and the several views illustrated in the accompanying drawings:

IN THE DRAWINGS

Figure 1:
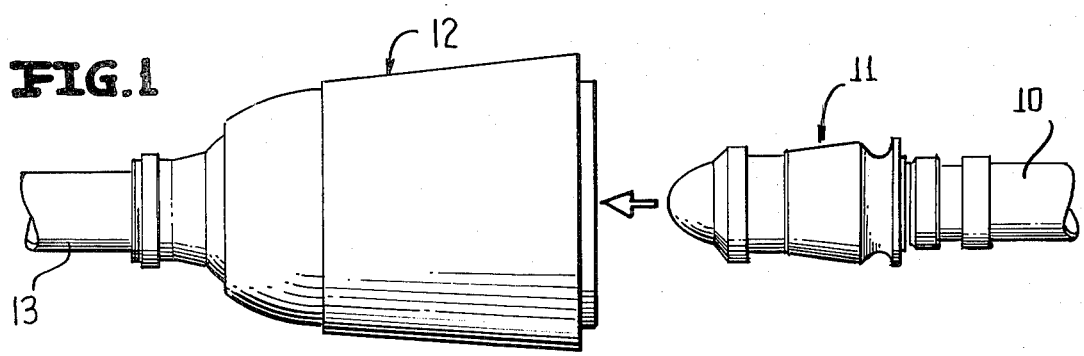
FIG. 1 is a schematic elevational view showing generally the relationship between a probe and drogue of an in-flight fueling system prior to assembly.

Referring now to the drawings in detail, it will be seen that there is illustrated a receiving line 10 having attached thereto a probe 11 which is cooperable with a drogue 12 carried by a fuel supplying line 13. It is to be understood that in a fueling operation, the probe 11 will enter into the drogue 12 and when fully seated therein, it will become interlocked with the drogue 12 with the probe 11 opening valve means in the drogue 12 so as to permit the entry of fuel into the probe 11. The specific details of the interlock between the probe 11 and the drogue 12 may be of any conventional type and of themselves do not form a part of this invention.

Figure 2:
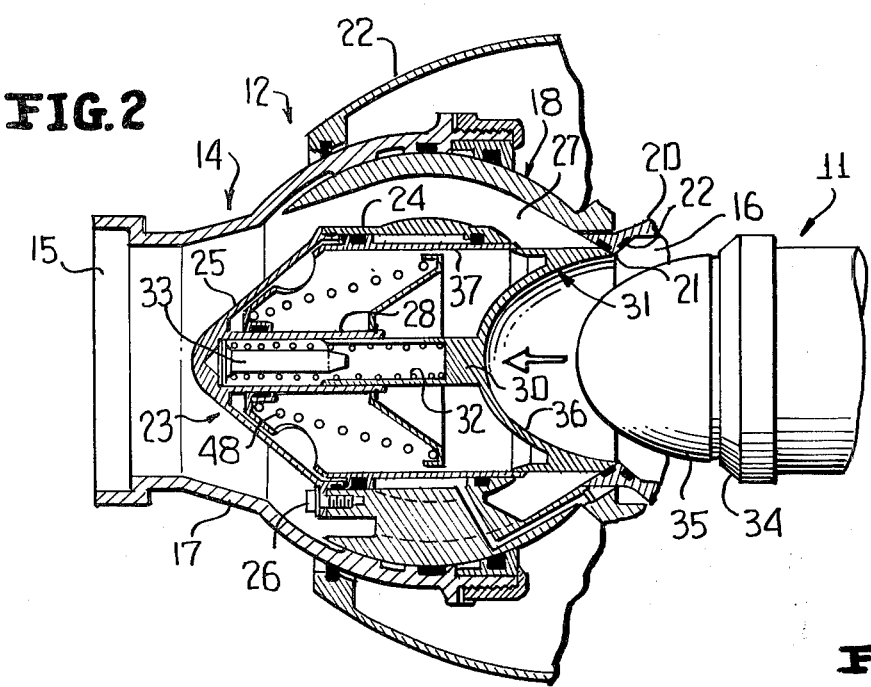
FIG. 2 is an enlarged view similar to FIG. 1 with portions of the drogue being in section and other portions broken away and the probe partly entered into, but not in a flow effecting position with respect to the drogue.

Referring now to FIG. 2 in particular, it will be seen that the drogue 12 includes a housing 14 which is of a multi-piece construction and includes an inlet 15 and an outlet 16. The housing 14 includes a housing member 17 which has detachably mounted therein a combined housing member and spider 18. The housing 14 also includes a housing member 20 which is provided with a pair of generally oppositely facing valve seats 21 and 22. The drogue 12 also includes an outer casing 22.

Mounted within the housing 14 is a valve assembly, generally identified by the numeral 23 which is carried by the combined housing member and spider 18. The valve assembly 23 includes a valve body which is in part defined by a generally cylindrical portion 24 of the combined housing portion and spider 18, and in part by a generally conical nose member 25, which is removably secured to the cylindrical portion 24 by means of fasteners 26. The construction of the combined housing member and spider 18 is such so as to provide a plurality of circumferentially spaced flow paths 27 around the valve assembly 23.

The conical nose portion 25 is provided with a centrally located, axially extending core 28 which is of a tubular construction. The core 28 has projecting thereinto a projecting support member 30 of a first valve member 31. The support member 30 is guided by its engagement with the core member 28 and is resiliently urged thereout of by a spring 32 so that the normal position of the valve member 31 is in sealing contact with the valve seat 21. A stop member 33 is positioned within the core 28 for engagement with the support member 30 to limit the opening movement of the valve member 31. The stop member 33 also functions as a guide for the spring 32.

Figures 3, 4:
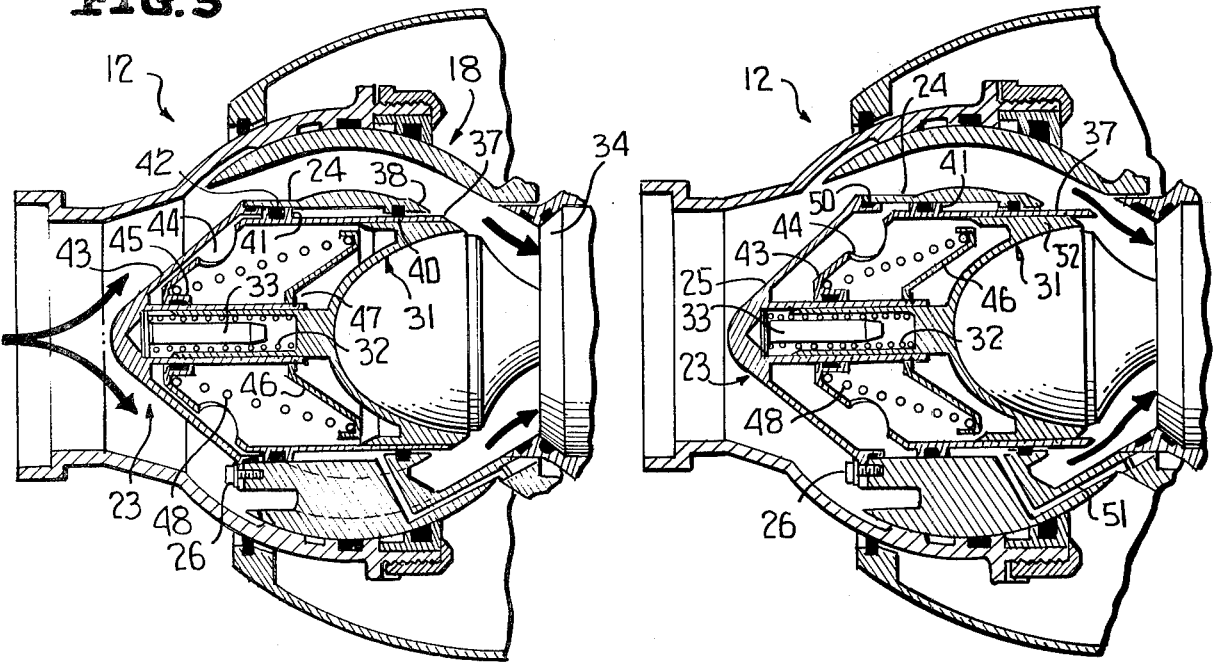
FIG. 3 is a view similar to FIG. 2 and shows the probe fully seated within the drogue with there being unrestricted flow through the drogue into the probe.
FIG. 4 is a view similar to FIG. 3 and shows a pressure responsive valve of the drogue in a flow restricting position in response to a pressure surge.

When the probe 11 enters into the drogue 12, a shoulder 34 thereon seats against the valve seat 22, as is shown in FIG. 3, and forms a seal between the probe 11 and the drogue 12. At this time a nose 35 of the probe 11 is generally seated within a cup shaped portion 36 of the valve member 31. The nose 35 is then projected to the left, as is shown in FIG. 3, unseating the valve member 31 and opening the probe 11 so as to dispense fuel therethrough. The fuel flows from inlet 15, through passages 27 and around nose 35 into probe 11, as is generally shown by the arrows in FIG. 3.

In order that the pressure of the fuel delivered through the outlet 16 may remain substantially constant, the valve assembly 23 also includes a pressure responsive valve member 37. The valve member 37 is generally cylindrical and is normally retracted generally within the cylindrical portion 24 of the combined spider and housing member 18. The valve member 37 is guidingly supported by the cylindrical portion 24 with the right edge portion of the cylindrical portion 24 including a radially inwardly directed projection 38 carrying a sealing ring 40 which engages the outer periphery of the valve member 37 and forms a seal therewith.

The left end portion of the valve member 37 is provided with an annular projection 41 which carries a sealing ring 42 in sealed engagement with the inner surface of the cylindrical portion 24. The projection 41 functions as a piston with the cylindrical portion 24 being the cylinder in a manner to be described hereinafter.

The valve member 37 is provided with a generally conical nose 43 which is normally spaced closely adjacent the nose portion 25. However, the nose 43 is provided with suitable apertures or openings 44 through which fuel under pressure may flow.

The nose 43 terminates in a guide portion 45 which closely fits the core member 38 and which is slidable thereon. The right end portion of the core member 28 is provided with a generally conical spring retainer 46 which is retained thereon against movement to the left by means of a locking ring 47. A conical spring 48 extends between the nose 43 and the spring support 46 and constantly urges the valve member 37 to the left to a retracted position.

With particular reference to FIG. 4, it is to be noted that the nose 25 is sealed relative to the cylindrical portion 24 by means of a sealing ring 50. Thus, no fuel can escape between the nose 25 and the cylindrical portion 24. Further, no fuel can normally escape between the cylindrical portion 24 and the valve member 37. Thus, any fuel entering into the space between the nose portion 25 and the nose 43 through the openings 44 will react on the annular projection 41 with the same functioning as a piston. In order that the valve member 37 may freely slide relative to the cylindrical portion 24, the space between the seals 40 and 42 is vented to the atmosphere by a vent passage 51.

It is to be noted that the valve member 31 includes a cylindrical body portion 52 which is telescoped within the valve member 37 in sliding guided engagement therewith. However, there is no seal between the valve member 37 and the cylindrical body 52 with the result that fuel under pressure entering into the probe 11 from the drogue 12 may pass around the valve member 31 into the valve member 37, through the openings 44 and into the space between the nose portion 25 and the nose 43 for reaction on the piston defined by the annular projection 41. Should this pressure be excessive, the force exerted by the spring 48 urging the valve member 37 to a retracted position will be overcome and the valve member 37 will be moved to the right into the flow passage of fuel exiting from the probe 11. This will automatically reduce the pressure of fuel flowing around the valve assembly 23 and out through the outlet. The amount of projection of the valve member 37 will, of course, be in accordance with the pressure of fuel being supplied by the drogue 12. Thus, any pressure variations above a predetermined norm will automatically be compensated for by the function of the valve member 37 which functions as a pressure regulator.

It will be readily apparent that the valve assembly 25 is one which may be readily incorporated in existing types of drogues and which is readily operable in combination with a conventional type of probe.

Although only a preferred embodiment of the invention has been specifically illustrated and described herein, it is to be understood that minor variations may be made in the construction of the valve assembly without departing from the spirit and scope of the invention, as defined by the appended claims.

What is claimed as new:

1. A drogue for use in combination with a pressurized supply line, said drogue comprising a housing, said housing including an inlet and an outlet, said housing having at said outlet means for receiving in internesting relation a probe, a signal valve assembly within said housing, said valve assembly including a first valve member for normally closing said outlet, and a second valve member at said outlet responsive to outlet pressure for selectively restricting outgoing flow when said first valve member is in an outletting position, said first valve member being telescoped relative to said second valve member.

2. The drogue of claim 1 wherein said second valve member is of the pressure responsive type.

3. The drogue of claim 1 wherein said second valve member is part of pressure control means for controlling the pressure of the outgoing product delivered to said outlet.

4. The drogue of claim 1 wherein said valve assembly includes pressure responsive means for positioning said second valve member in accordance with pressure within said housing to restrict outgoing flow and thereby limit pressure at said outlet.

5. The drogue of claim 1 wherein said valve assembly includes a fixed valve body, cooperating means on said valve body and said second valve member mounting said second valve member for movement between retracted and projecting positions, and resilient means reactive on said valve body and said second valve member urging said second valve member to said retracted position.

6. The drogue of claim 5 together with piston means between said valve body and said second valve member responsive to outlet pressure to urge said second valve member to a flow restricting projecting position.

7. The drogue of claim 5 together with means mounting said first valve member for movement independently of said second valve member.

8. The drogue of claim 7 wherein said valve body includes a central core, and said first valve member is supported by said central core.

9. The drogue of claim 7 wherein said valve body includes a central core, said first valve member having a support portion telescoped relative to said central core and supported thereby, and resilient means between said central core and said support portion urging said first valve member to an outlet closing position.

10. The drogue of claim 1 wherein said valve assembly includes a fixed valve body having a sleeve portion, and said sleeve portion being in internested relation with said first and second valve members, and resilient means carried by said valve body reacting on said first and second valve members and urging said valve members in opposite directions.

11. The drogue of claim 1 wherein said valve assembly includes a fixed valve body, means mounting said first valve member in said valve body for axial movement relative thereto, and other means mounting said second valve member within said valve body between said valve body and said first valve member for separate axial movement.

12. The drogue of claim 11 together with piston means between said valve body and said second valve member responsive to outlet pressure to urge said second valve member to a flow restricting projecting position, said piston being on the exterior of said second valve member with said valve body forming a cylinder for said piston.

* * * * *